March 6, 1928.

C. KMENTT 1,661,184

MEANS FOR MAKING WARPLESS TIRE FABRICS IN CONTINUOUS ROLLS

Filed Dec. 28, 1925   5 Sheets-Sheet 1

INVENTOR
Cornel Kmentt
by Ralph Douath
Paul Purchard
Attorneys

March 6, 1928.

C. KMENTT 1,661,184

MEANS FOR MAKING WARPLESS TIRE FABRICS IN CONTINUOUS ROLLS

Filed Dec. 28, 1925    5 Sheets-Sheet 3

INVENTOR
Cornel Kmentt
by Ralph Donath &
Paul Purchard.
Attorneys.

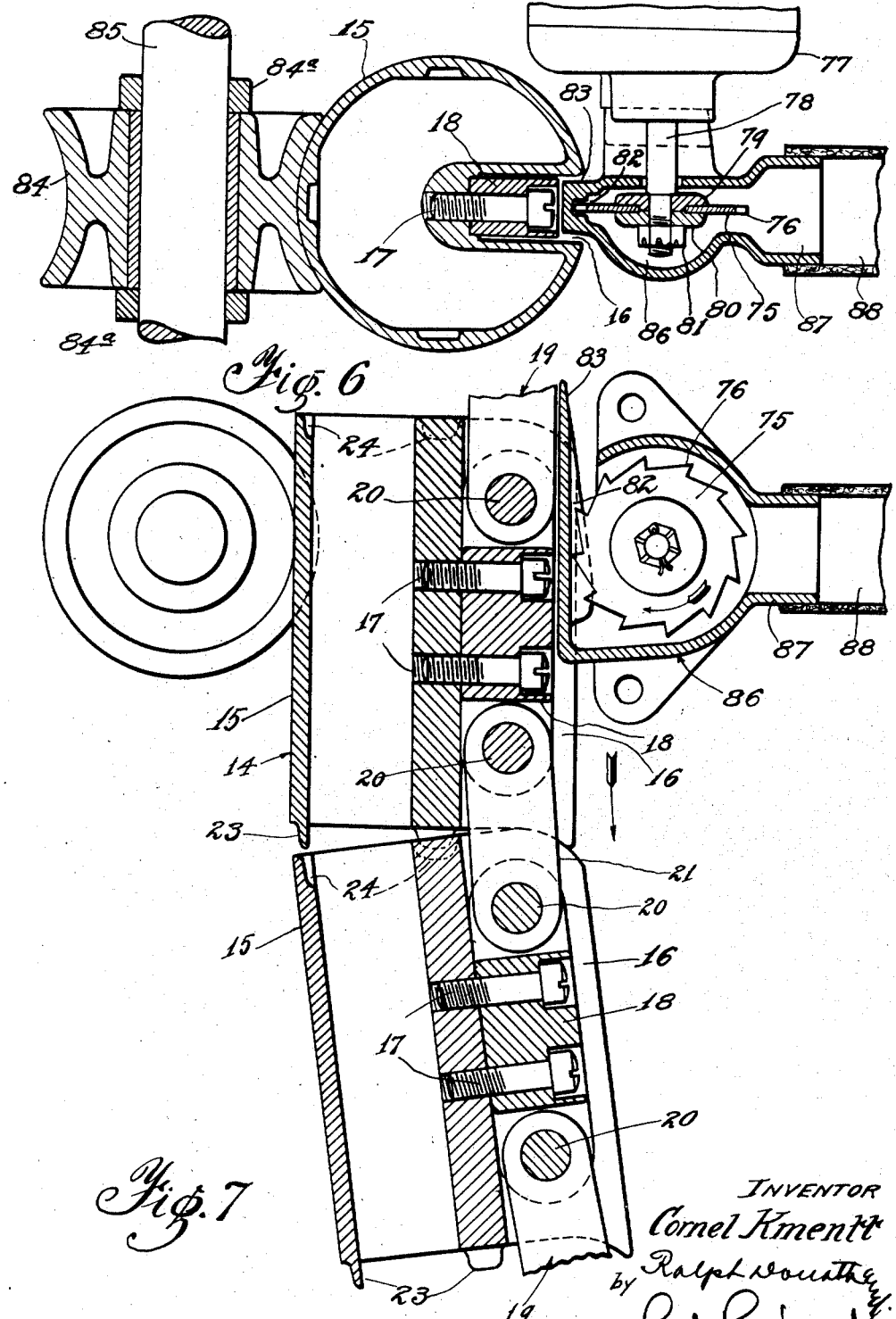

March 6, 1928. 1,661,184
C. KMENTT
MEANS FOR MAKING WARPLESS TIRE FABRICS IN CONTINUOUS ROLLS
Filed Dec. 28, 1925  5 Sheets-Sheet 5

INVENTOR
Cornel Kmentt
by Ralph Donath and
Paul Purchard
Attorneys.

Patented Mar. 6, 1928.

1,661,184

UNITED STATES PATENT OFFICE.

CORNEL KMENTT, OF YOUNGSTOWN, OHIO.

MEANS FOR MAKING WARPLESS TIRE FABRICS IN CONTINUOUS ROLLS.

Application filed December 28, 1925. Serial No. 77,943.

This invention relates to methods and means for making warpless impregnated fabrics and more in particular to means for making so called warpless "bias-fabrics" used in the manufacture of pneumatic tires for vehicles.

As is generally known, the body, or carcass, of pneumatic tires is built up of rubber impregnated cotton goods which, according to their weave, are called "fabric" or "cord" goods in the trade. These weaves comprise longitudinal and transverse threads, (or warp) alternately bent over and under each other. In fabric goods the transverse threads are much closer than in the cord goods. When a tire is in operation, considerable friction is produced at the points where the cotton threads cross each other. The heat generated by this friction acts very detrimentally on the surrounding rubber and greatly reduces the life of a tire in service.

The primary object of this invention is to provide a machine for the continuous manufacture of warpless impregnated fabric stock by means of an endless mandrel adapted to travel in parts along a straight path. Another object of this invention is to provide on a machine of the above stated character means for properly compacting the impregnated fabric stock, for automatically cutting and winding the same on suitable rolls, ready to be applied in the manufacture of pneumatic tires of the so-called "cord" type. Additional features and advantages of this invention will appear from the following description considered in connection with the accompanying drawings forming part of this application and in which:—

Fig. 6 is an enlarged horizontal section through the endless mandrel, showing also a chain-link and guide-roll for the mandrel and the cutting mechanism for the fabric.

Fig. 7 represents a fractional vertical section through the mandrel, showing chain links, method of fastening the section of the mandrel to the chain, the guide-roll for the mandrel and the fabric cutting mechanism.

Figure 1:
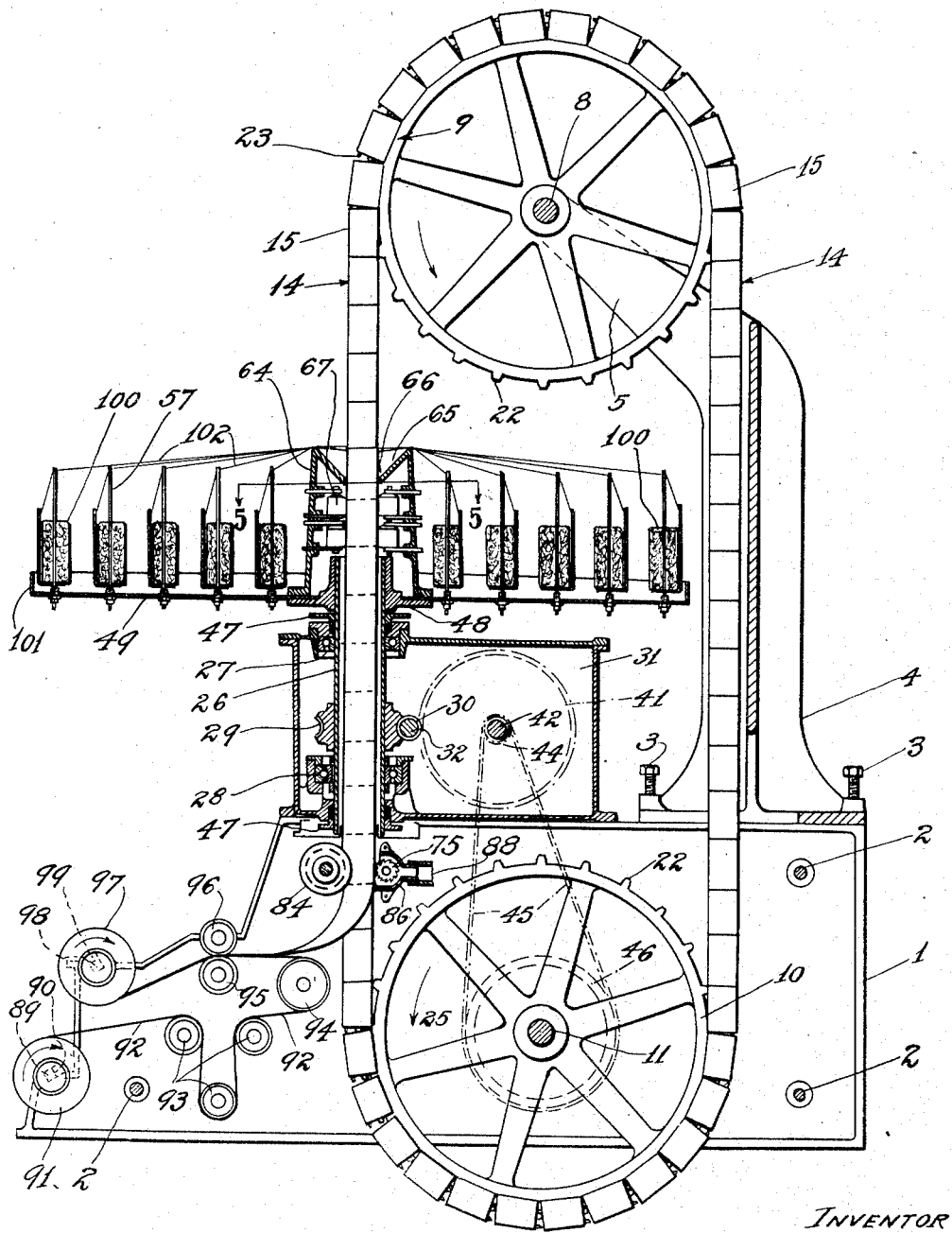
Fig. 1 is a side elevation of the machine, partly in section.
Figure 2:
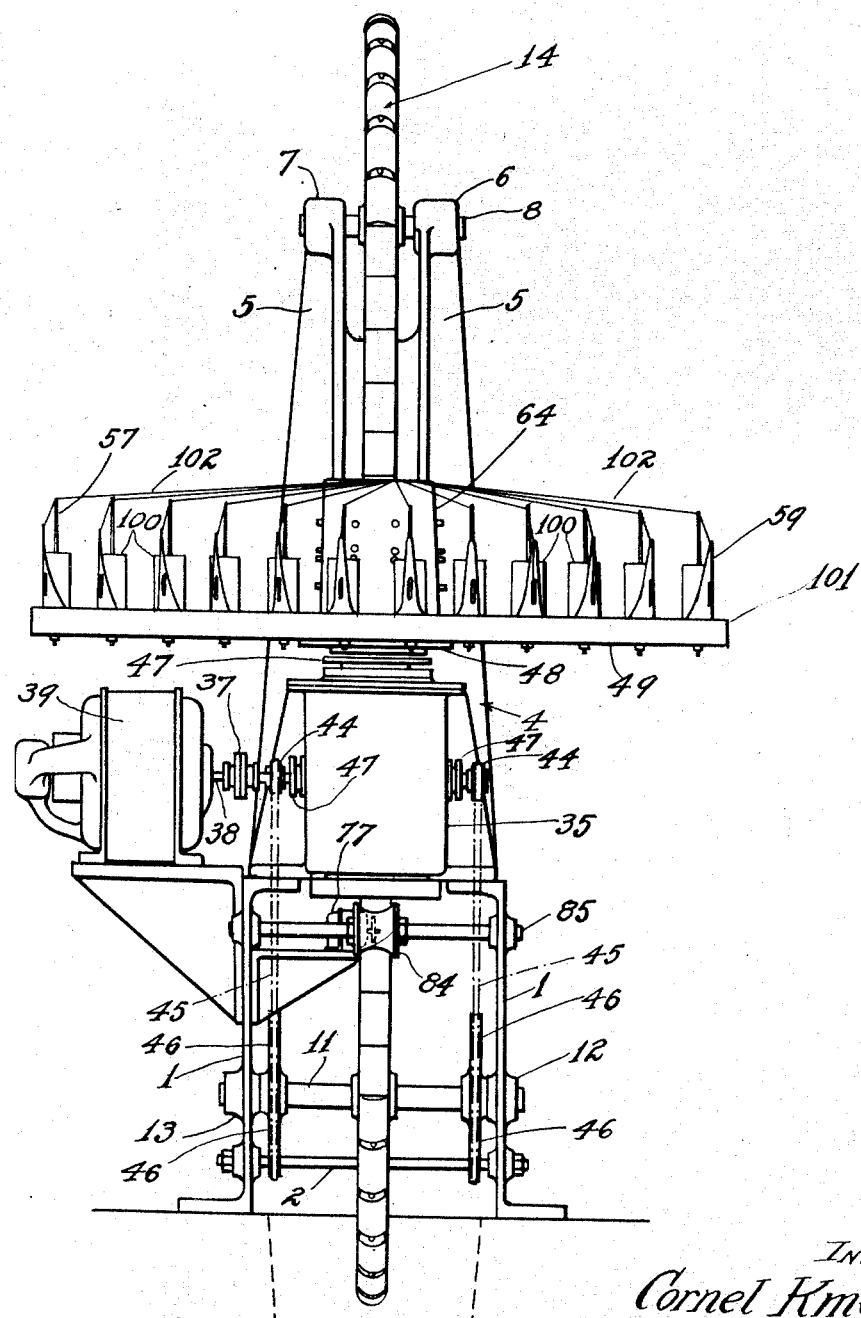
Fig. 2 is a front elevation of the machine with a wind-up mechanism for the finished fabric omitted.
Figure 3:
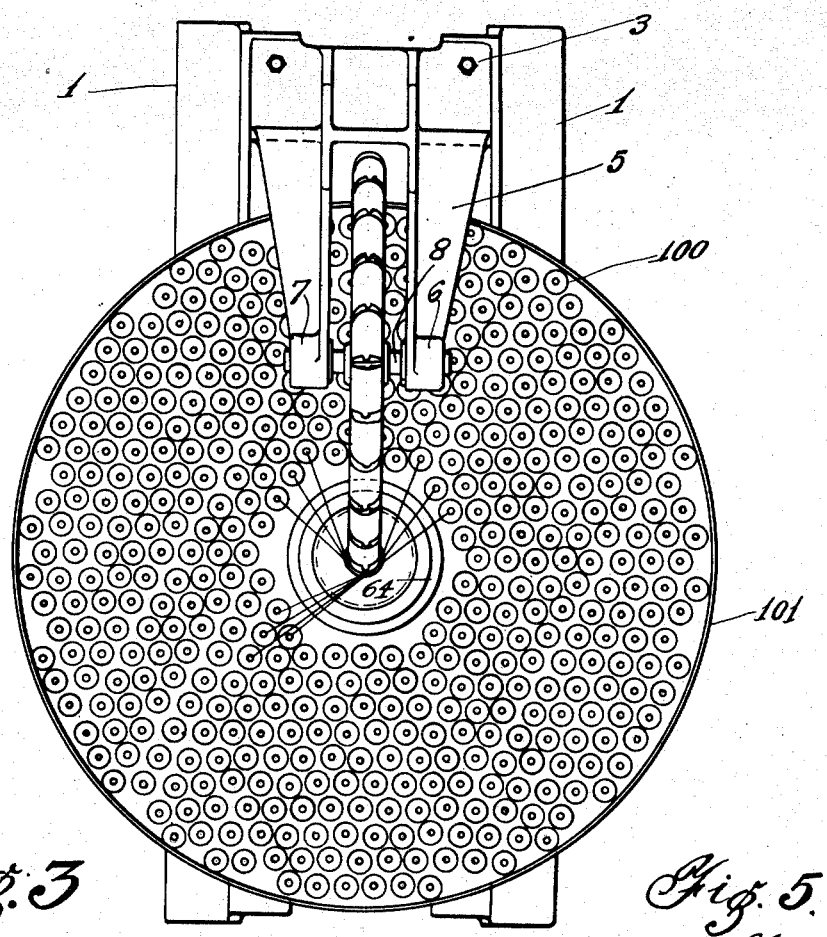
Fig. 3 is a top plan view of the machine.

Referring to the drawings, the machine comprises two side-frames 1 held in proper relation by means of the tie-bolts 2. Upon these side frames is secured by means of the adjusting bolts 3 the vertical post 4 terminating at the upper end with the two inwardly inclined, parallel arms 5 provided with the axially alined bearings 6 and 7 in which is rotatably mounted the horizontal shaft 8 of the upper mandrel-sprocket 9.

In vertical alinement with this sprocket is securely fastened on a shaft 11 the lower or driving mandrel-sprocket 10. The shaft 11 runs in suitable bearings 12 provided in the frames 1.

Trained about these sprockets is the flexible and endless mandrel 14, the construction of which is best illustrated in Figs. 6 and 7. As shown therein, the mandrel is composed of numerous hollow sections 15 of substantially cylindrical shape and provided with a longitudinal, outwardly open, groove 16, of suitable width and depth. These sections are each mounted by means of bolts 17 on the block-links 18 of a sprocket-chain 19. These block-links are hingedly connected together by means of the pins 20 and the short and parallel links 21 which are adapted to receive therebetween the teeth or sprockets 22 of the lower and upper sprocket-wheels.

The ends of the individual mandrel sections are formed into the combination of a plane normally disposed to the axes of said sections and of a cylindrical portion, the curvature of which is concentric to one of the pins 20 in each section. The purpose of this construction is to permit the outer ends of the mandrel section to open up when passing over the sprocket-wheels and to close up again when traversing the vertical stretches between the latter. To prevent any distortion in the alinement of the mandrel sections, one end thereof carries a set of dowels 23 and the other end a series of notches 24 suitably placed so that the dowels of one section will snugly register into the notches of the adjacent section.

The driving sprocket 10 is rotated, by means of a drive mechanism to be described later, in the counter-clock sense indicated by the arrow 25 so that the downwardly moving front section of the mandrel forms the tight side and the rear section the slack side of the mandrel.

The warpless, "on the bias" tire fabric is formed on the endless mandrel by means of the following mechanism:

Surrounding a portion of the front section of the mandrel is a hollow, vertical, and concentric shaft 26 the inside diameter of which is approximately one inch greater than the outside diameter of the mandrel 14. This shaft is carried by two bearings, preferably of the anti-friction type, such as the upper and lower ball bearings 27 and 28, respectively. The upper bearing is usually adapted to take radial loads only, whereas the lower bearing 28 takes care of all thrust as well as of radial loads. The shaft 26 is rotated by means of a worm-wheel 29 securely mounted thereon intermediate said ball-bearings and driven by the worm 30 of the main driving mechanism. The latter is mostly enclosed in a gear case 31 and comprises a worm-shaft 32 mounted in bearings 33 and 34 positioned in the sides 35 and 36 of said housing. The worm-shaft is connected by means of a clutch-coupling 37 to the shaft 38 of the electric motor 39.

Figures 4, 5:
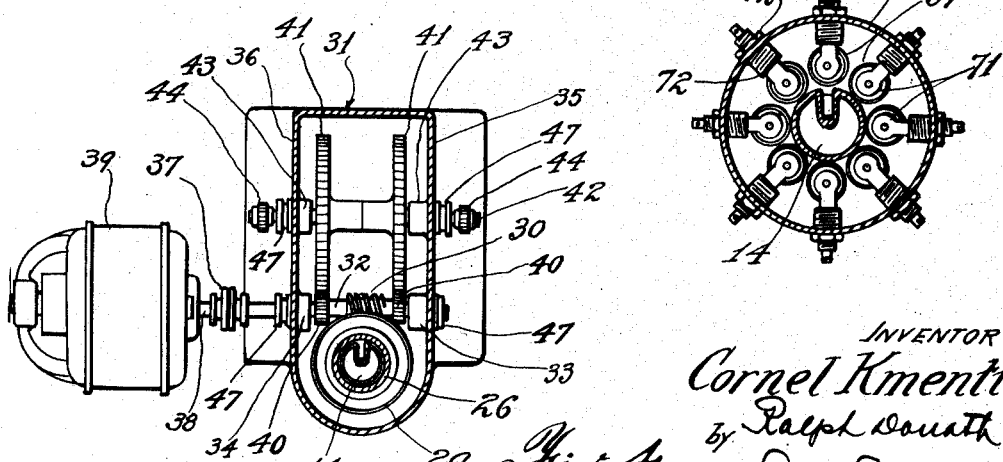
Fig. 4 is a horizontal section through the driving mechanism of the machine.
Fig. 5 is a cross-section taken on line 5—5, in Fig. 1, showing the compacting, or pressing, rolls of the machine.

The power of the latter is also used to operate the endless mandrel. As shown in Fig. 4, this is done by securing on the worm-shaft 32, and at both sides of the worm, the pinions 40 which mesh with a pair of gears 41 keyed on a shaft 42 running in suitable bearings 43, also positioned in the sides 35 and 36. The shaft 42 projects outwardly on said sides and carries at both ends small sprocket-wheels 44 which are connected by means of the chain drives 45 to the large sprocket-wheels 46 secured on the shaft 11, at both sides of the drive-sprocket 10. It will thus be seen that by this arrangement an accurate speed relation between the mandrel and the hollow shaft 26 is positively maintained. The gear-case 31 is filled with an oil or grease lubricant to reduce friction in the various moving parts and, in order to prevent any escape of said lubricant which, as is well known, acts very detrimentally on rubber, the various bearings are provided with stuffing boxes of usual design, which boxes are identified in the drawings by the common numeral 47.

Figure 8:
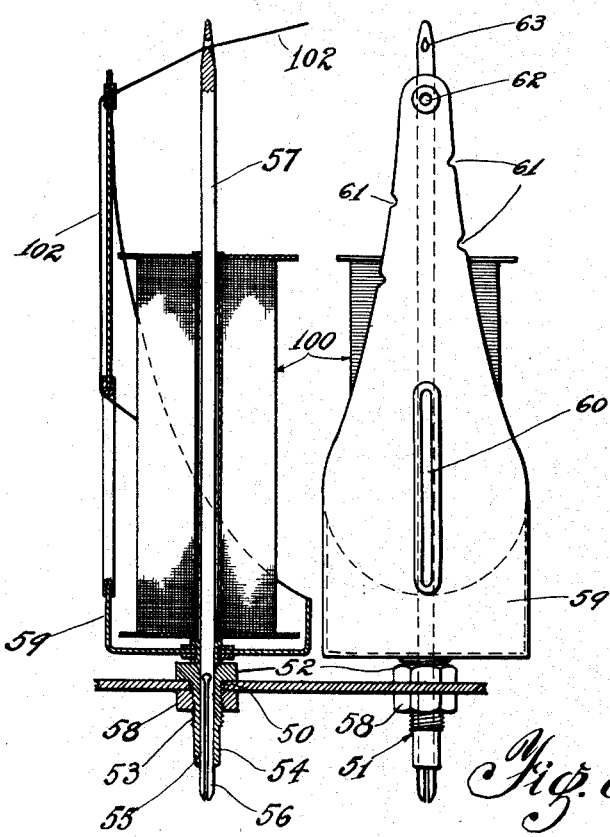
Fig. 8 shows a vertical section through one of the many spool carrying spindles in its socket and a front view of an adjacent spool with its thread guiding shell.

Securely mounted on the upper end of the hollow shaft 26 is a flanged hub 48 to which is secured in any desired manner a large horizontal disc 49, (preferably provided with a flange 101 of suitable height) upon which are evenly distributed, honey-comb like, a great number of threaded apertures 50 wherein are secured the spindle-sockets 51, best illustrated in Fig. 8. As shown therein, each socket resembles a bolt having a polygonal head 52 and a threaded shank 53 terminating with a smooth and reduced portion 54. Drilled right through the socket is a central aperture 55, slightly flared at the top to facilitate the insertion of the snug fitting lower ends 56 of the spindles 57. Moreover, each socket is locked in position by means of a lock-nut 58.

The lower end 56 of each spindle is tapered and split to afford a tight and snug fit in the sockets. Each spindle carries a spool 100 resting in a shell 59, of pressed steel or aluminum, provided with a longitudinal slot 60, near the center, with staggered notches 61 in its upper edges and with an eye 62 near the top. The upper end of the spindle 57 projects considerably above and beyond the top of the shell, is tapered and has an eye 63 of suitable size and shape to be engaged by the thread 102 of the spool 100.

Figure 9:
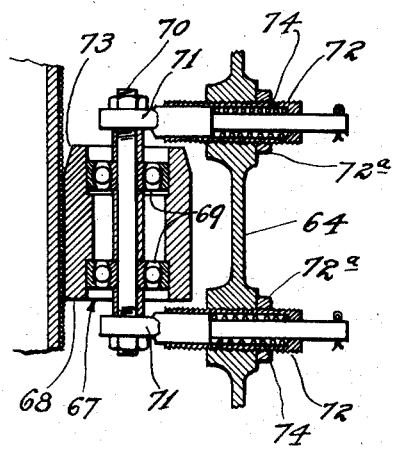
Fig. 9 is a vertical section through one of the spring actuated pressing rolls.

Centrally mounted on the horizontal disc 49 is a hollow cylindrical shell 64 having a funnel shaped top 65 provided with a central aperture 66 through which the mandrel travels. Within this shell are mounted a series of pressing rolls 67 disposed to bear all around the mandrel. As shown in Fig. 9, these rolls comprise each a hollow roller 68 mounted for rotation, by means of the ball bearings 69 upon a stationary axle 70 which is secured at each end in bracket 71 guided for longitudinal movement in the outwardly threaded sleeves or socket 72 engaging suitably threaded apertures provided in the shell 64. These rollers are preferably slightly tapered at the upper end, as indicated by the numeral 73, to prevent any binding or cutting of the downwardly moving impregnated fabric. In this figure each roller is shown as being pressed toward the mandrel by a spring 74 surrounding the reduced shank of the bracket 71 and placed within the socket 72. The latter is locked in its adjusted position by means of a lock nut 72ª.

If desired, the rollers may be pressed toward the mandrel by means of compressed air, carbonic acid or other gas, or by means of electro-magnetic action. Also, these rollers may be supplied with electrical heating elements, or may alternate with revolving brushes adapted to cover the layers of cord wound on the mandrel with liquefied rubber or other convenient substance.

The tubular fabric formed on the mandrel is slit open by means of a cutting mechanism especially shown in Figs. 6 and 7 as consisting of a circular saw 75 having a number of suitably shaped teeth 76. This saw runs at a relatively high speed and is preferably driven by an individual electric motor 77, by securing it at the end of the motor shaft 78 by means of the clamping discs 79 and 80, and the nut 81 engaging the threaded end of the shaft. The cutter 75 engages a narrow slot 82 provided in the wedge-shaped, finger-like, member 83 projecting into the groove 16 of the mandrel 14. Opposite the cutter is a concave guiding-roll 84 rotatively mounted, between collars 84ª, on an axle 85 suitably secured to the side frames 1. The object of this roll is to prevent at this point any tendency of the mandrel to sway aside. The cutting mechanism is placed at a distance below the shaft 26 and the cutter is enclosed in a housing 86 having an outlet 87 connected to a vacuum line 88 in order to collect and carry away all the minute dust-like cuttings produced by the action of the rapidly revolving cutter against the cords on the mandrel.

Below the cutting mechanism is arranged a winding mechanism which resembles similar devices used nowadays in the rubber, paper and textile industries. Succinctly stated, this winding mechanism comprises an axle 89 resting in socket-bearings 90 and carrying a muslin-like fabric generally known in the trade as "liner". This liner 92 is passed over several tension-rolls 93 and the guiding-roll 94, thence over an idler roll 95 against which a pressure-roll 96 is bearing. The "on the bias" cut fabric is also passed between the last two mentioned rolls and the liner and tire fabric are finally wound together on the wind-up roll 97 mounted on an independently rotated axle 98 resting in the socket-bearings 99.

Having described the various principal parts of this machine, its mode of operation will be readily understood and may be briefly stated as follows: First a set of spindles is prepared, by placing spools 100 of rubber impregnated cords upon pin 57. About three yards of cord is pulled off each spool, and threaded first through slot 60, then across the notches 61 and through the eyes 62 and 63. These spindles are pushed into the sockets 51 and the overhanging ends of the cords are pulled towards the mandrel 14 and attached to it by winding them around the mandrel a desired amount of turns. In the meantime a roll of "liner" is placed upon the axle 89 and the fabric is pulled over the tension rolls 93, over the guiding roll 94, between the idler and pressure rolls 95 and 96 and started on the wind-up roll 97. When the machine is set in motion, the disc 49 begins to revolve around the down-moving part of the mandrel 14. The rubber impregnated cords are pulled off their spools, drawn over the top of the cylindrical shell 64 and through the funnel-shaped surface guided onto the slowly down-moving mandrel. The continued relative motion of the disc and mandrel causes the cords to wrap themselves around the mandrel in screw-lines. As the mandrel with the cords wrapped around it passes down, the pressing-rollers 67 bear upon them and cause the cords to stick together. If desired, this action may be aided by revolving brushes filling any interstices between the cords with liquid rubber, or by heating-rollers cementing the cords and rubber into one solid coating. As the mandrel moves farther down, the finger-like member 83, projecting into the groove 16 of the mandrel, will catch the lower edge of the coating, and the further downward motion of the mandrel will cause the coating to ride up the wedge-shaped top of finger 83 and pull the individual layers of cord taut so that they may be easily cut by the cutter 75. The wrapping on the mandrel, thus cut, will open up and the lower end of the flat strip or ribbon will be laid on the liner 92 passing near by and, once caught by the pressure-roll 96, will be carried on and wound up into a roll 97, ready for use in the tire-building machines. While one set of spindles is on the machine, additional sets are being made ready by an assistant, so that the changing of spindles may be accomplished with as little loss of time as possible.

The position of the slots 60 in the shells 59 causes the cords to pull away from the spools all the time, irrespective of the spools being placed on the spindles right or left; the pulling of the cords over the several notches 61 and through the eye 62 and 63 causes the cords to leave the spindles under identical conditions and, therefore, under equal tension, the latter having been determined by experiment deciding the number and the sequence of the notches 61 to be engaged to give the best results for different grades of cord-fabric.

The location of the eyes in pins 57 causes the cords to leave the spindles at a point in their axes, and therefore, radially, and in a definite relation to the mandrel; the cords from no two spindles reaching the mandrel under exactly the same angle, thus avoiding a premature sticking together of the cords. The latter feature is still enhanced by having the top of the shell-member 64 well above the level of the spindle-eyes 63. This arrangement will preclude "gumming up" of the goods, even if the cords were placed by ignorance or mischief in wrong order on the mandrel. One or two revolutions of the disc will strengthen out any such mess, and guide each cord automatically into its place.

The cords, impregnated with the proper rubber compound, will, on reaching the mandrel, tenaciously stick together, forming a hose-like wrapper around the mandrel. The individual cords of this wrapper are, as set forth above, arranged in screw-like lines, and this will cause them, when cut, to lie diagonally across the resulting strip or tape. By properly adjusting the speed relation between the mandrel and disc, a continuous strip of rubberized fabric is formed, free from cross-threads (or "warp") and with all its cords lying at 45 degrees to the length of the fabric, or, as it is called by the trade, "on the bias".

As will be understood, as suggested herein, there may be slight changes made in the construction and arrangement of the details of my invention without departing from the field and scope of the same, and I intend to include all such variations, as fall within the scope of the appended claims, in this application in which the preferred form only of my invention is disclosed.

I claim:—

1. In a machine for making tubular fabrics, a drive-sprocket and a driven sprocket; an endless mandrel trained about said sprockets and comprising a plurality of rigid sections, and connecting links for hingedly joining said sections; said links being disposed in parallel eccentric relation to the longitudinal axis of said sections and adjacent said sprockets whereby said sections will jointly form a substantially rigid continuous body when traveling rectilinearly and open up outwardly when traveling around said sprockets.

2. In a machine for making tubular fabrics, a drive-sprocket and a driven sprocket; an endless mandrel trained about said sprockets and comprising a plurality of hollow cylindrical sections each provided with a longitudinal outwardly open groove, and connecting links positioned within said grooves for hingedly joining said sections; said links being disposed in parallel eccentric relation to the longitudinal axis of said sections and adjacent said sprockets whereby said sections will jointly form a substantially rigid continuous body when traveling rectilinearly and open up outwardly when traveling around said sprockets.

3. In a machine for making tubular fabrics, a drive-sprocket and a driven sprocket; an endless mandrel trained about said sprockets and comprising a plurality of hollow cylindrical sections each provided with a longitudinal outwardly open groove, and connecting links positioned within said grooves for hingedly joining said sections; said links being disposed in parallel eccentric relation to the longitudinal axis of said sections and adjacent said sprockets whereby said sections will jointly form a substantially rigid continuous body when traveling rectilinearly and open up outwardly when traveling around said sprockets, said connecting links also engaging with said sprockets for the purpose of operating said mandrel.

4. In a machine for making tubular fabrics, a drive-sprocket and a driven sprocket; an endless mandrel trained about said sprockets and comprising a plurality of hollow cylindrical sections each provided with a longitudinal outwardly open groove, and connecting links positioned within said grooves for hingedly joining said sections; said links being disposed in parallel eccentric relation to the longitudinal axis of said sections and adjacent said sprockets whereby said sections will jointly form a substantially rigid continuous body when traveling rectilinearly and open up outwardly when traveling around said sprockets, and means for holding said sections into alignment when traveling rectilinearly.

5. In a machine for making tubular fabrics, a drive-sprocket and a driven sprocket; an endless mandrel trained about said sprockets and comprising a plurality of hollow cylindrical sections each provided with a longitudinal outwardly open groove, and connecting links positioned within said grooves for hingedly joining said sections; said links being deposed in parallel eccentric relation to the longitudinal axis of said sections and adjacent said sprockets whereby said sections will jointly form a substantially rigid continuous body when traveling rectilinearly and open up outwardly when traveling around said sprockets, and means to prevent transverse relative displacement of said sections when traveling rectilinearly.

6. In a machine for making tubular fabrics, a drive-sprocket and a driven sprocket; an endless mandrel trained about said sprockets and comprising a plurality of hollow cylindrical sections each provided with a longitudinal outwardly open groove, and connecting links positioned within said grooves for hingedly joining said sections; said links being disposed in parallel eccentric relation to the longitudinal axis of said sections and adjacent said sprockets whereby said sections will jointly form a substantially rigid continuous body when traveling rectilinearly and open up outwardly when traveling around said sprockets, and means formed integrally with said sections to prevent transverse relative displacement thereof when traveling rectilinearly.

7. In a machine for making tubular fabrics, a drive-sprocket and a driven sprocket; an endless mandrel trained about said sprocket and comprising a plurality of hollow cylindrical sections each provided with a longitudinal outwardly open groove, and connecting links positioned within said grooves for hingedly joining said sections; said links being disposed in parallel eccentric relation to the longitudinal axis of said sections and adjacent said sprockets whereby said sections will jointly form a substantially rigid body when traveling rectilinearly and open up outwardly when traveling around said sprockets, and dowels positioned at one end of each section; each section having notches positioned at the other end and disposed to be engaged by the dowels of the next adjacent section.

8. In a machine of the character described, the combination of a drive-sprocket and a driven sprocket positioned in spaced relation in a common vertical plane; an endless flexible mandrel trained about said sprockets and comprising a plurality of sections; connecting links for hingedly joining said sections; said links being disposed in parallel eccentric relation to the longitudinal axis of said sections and adjacent said sprockets whereby the said sections will jointly form a substantially rigid continuous body when traveling rectilinearly and open up outwardly when traveling around said sprockets; a plurality of rotatable spools for adhesive threads disposed around said mandrel; a common support for said spools normal to and concentric with a straight portion of said mandrel; means for moving said sprockets and mandrel, and means for rotating said support around said mandrel for winding thereon said adhesive threads.

9. In a machine of the character described, the combination of a drive-sprocket and a driven sprocket positioned in spaced relation in a common vertical plane; an endless flexible mandrel trained about said sprockets and comprising a plurality of sections; connecting links for hingedly joining said sections; said links being disposed in parallel eccentric relation to the longitudinal axis of said sections and adjacent said sprockets whereby said sections will jointly form a substantially rigid continuous body when traveling rectilinearly and open up outwardly when traveling around said sprockets; a plurality of rotatable spools for adhesive threads disposed around said mandrel; a common support for said spools normal to and concentric with a straight portion of said mandrel, and unitary means for simultaneously operating said mandrel and rotating said support around the mandrel for winding thereon said adhesive threads.

10. In a machine of the character described, the combination of a drive-sprocket and a driven sprocket positioned in spaced relation in a common vertical plane; an endless flexible mandrel trained about said sprockets and comprising a plurality of sections; connecting links for hingedly joining said sections; said links being disposed in parallel eccentric relation to the longitudinal axis of said sections and adjacent said sprockets whereby said sections will jointly form a substantially rigid continuous body when traveling rectilinearly and open up outwardly when traveling around said sprockets; a plurality of rotatable spools for adhesive threads disposed around said mandrel; a common support for said spools normal to and concentric with a straight portion of said mandrel; unitary means for simultaneously operating said mandrel and rotating said support around the mandrel for winding thereon said adhesive threads, and pressing rolls disposed in parallel relation with said straight portion for compacting the adhesive threads wound thereon.

11. In a machine of the character described, the combination of a drive-sprocket and a driven sprocket positioned in spaced relation in a common vertical plane; an endless flexible mandrel trained about said sprockets and comprising a plurality of sections; connecting links for hingedly joining said sections; said links being disposed in parallel eccentric relation to the longitudinal axis of said sections and adjacent said sprockets whereby said sections will jointly form a substantially rigid continuous body when traveling rectilinearly and open up outwardly when traveling around said sprockets; a plurality of rotatable spools for adhesive threads disposed around said mandrel; a common support for said spools normal to and concentric with a straight portion of said mandrel; unitary means for simultaneously operating said mandrel and rotating said support around the mandrel for winding thereon said adhesive threads, and resiliently mounted pressing-rolls disposed in parallel relation with said straight portion for compacting the adhesive threads wound thereon.

12. In a machine of the character described, the combination of a drive-sprocket and a driven sprocket positioned in spaced relation in a common vertical plane; an endless flexible mandrel trained about said sprockets and comprising a plurality of sections; connecting links for hingedly joining said sections; said links being disposed in parallel eccentric relation to the longitudinal axis of said sections and adjacent said sprockets whereby said sections will jointly form a substantially rigid continuous body when traveling rectilinearly and open up outwardly when traveling around said sprockets; a plurality of rotatable spools for adhesive threads disposed around said mandrel; a common support for said spools normal to and concentric with a straight portion of said mandrel; unitary means for simultaneously operating said mandrel and rotating said support around the mandrel for winding thereon said adhesive threads, and pressing-rolls disposed in parallel relation with said straight portion and revolving with said support for compacting the adhesive threads wound on said mandrel.

13. In a machine of the character described, the combination of a drive-sprocket and a driven sprocket positioned in spaced relation in a common vertical plane; an endless flexible mandrel trained about said sprockets and comprising a plurality of sections; connecting-links for hingedly joining said sections; said links being disposed in parallel eccentric relation to the longitudinal axis of said sections and adjacent said sprockets whereby said sections will jointly form a substantially rigid continuous body when traveling rectilinearly and open up outwardly when traveling around said sprockets; a plurality of rotatable spools for adhesive threads disposed around said mandrel; a common support for said spools normal to and eccentric with a straight portion of said mandrel; unitary means for simultaneously operating said mandrel and rotating said support around the mandrel for winding thereon said adhesive threads, and cooperative means for longitudinally cutting the tube formed by said wound threads to produce a flat strip of warpless fabric.

14. In a machine of the character described, the combination of a drive-sprocket and a driven sprocket positioned in spaced relation in a common vertical plane; an endless flexible mandrel trained about said sprockets and comprising a plurality of sections; connecting-links for hingedly connecting said sections; said links being disposed in parallel eccentric relation to the longitudinal axis of said sections and adjacent said sprockets whereby said sections will jointly form a substantially rigid continuous body when traveling rectilinearly and open up outwardly when traveling around said sprockets; a plurality of rotatable spools for adhesive threads disposed around said mandrel; a common support for said spools normal to and concentric with a straight portion of said mandrel; unitary means for simultaneously operating said mandrel and rotating said support around the mandrel for winding thereon said adhesive threads, and means for varying the tension in the threads prior to winding the same around said mandrel.

15. In a machine of the character described, the combination of a drive-sprocket and a driven sprocket positioned in spaced relation in a common vertical plane; an endless flexible mandrel trained about said sprockets and comprising a plurality of sections; connecting-links for hingedly joining said sections; said links being disposed in parallel eccentric relation to the longitudinal axis of said sections and adjacent said sprockets whereby said sections will jointly form a substantially rigid continuous body when traveling rectilinearly and open up outwardly when traveling around said sprockets; a plurality of rotatable spools for adhesive threads disposed around said mandrel; a common support for said spools normal to and concentric with a straight portion of said mandrel; unitary means for simultaneously operating said mandrel and rotating said support around the mandrel for winding thereon said adhesive threads; means for varying the tension in the threads prior to winding the same around said mandrel, and means for guiding said threads onto said mandrel.

16. In a machine of the character described, the combination of a drive-sprocket and a driven sprocket positioned in spaced relation in a common vertical plane; an endless flexible mandrel trained about said sprockets and comprising a plurality of sections; connecting-links for hingedly joining said sections; said links being disposed in parallel eccentric relation to the longitudinal axis of said sections, and adjacent said sprockets whereby said sections will jointly form a substantially rigid continuous body when traveling rectilinearly and open up outwardly when traveling around said sprockets; a plurality of rotatable spools for adhesive threads disposed around said mandrel; a common support for said spools normal to and concentric with a straight portion of said mandrel and rotating said support around said mandrel for winding thereof said adhesive threads; means for varying the tension in the threads prior to winding the same around said mandrel, and unitary means for guiding all of said threads onto said mandrel.

17. In a machine of the character described, the combination of a drive-sprocket and a driven sprocket positioned in spaced relation in a common vertical plane; an endless flexible mandrel trained about said sprockets and comprisng a plurality of sections; connecting-links for hingedly joining said sections; said links being disposed in parallel eccentric relation to the longitudinal axis of said sections and adjacent said sprockets whereby said sections will jointly form a substantially rigid continuous body when traveling rectilinearly and open up outwardly when traveling around said sprockets; a plurality of rotatable spools for adhesive threads disposed around said mandrel; a common disc-like support for said spools normal to and concentric with a straight portion of said mandrel; a cylindrical shell disposed centrally on said support and traversed by said mandrel, and pressing rolls positioned within said shell and disposed in parallel relation with said straight portion for compacting the adhesive threads wound thereon.

18. In a machine of the character described, the combination of a drive-sprocket and a driven sprocket positioned in spaced relation in a common vertical plane; an endless flexible mandrel trained about said sprockets and comprising a plurality of sections; connecting-links for hingedly joining said sections; said links being disposed in parallel eccentric relation to the longitudinal axis of said section and adjacent said sprockets whereby said sections will jointly form a substantially rigid continuous body when traveling rectilinearly and open up outwardly when traveling about the sprockets; a plurality of rotatable spools for adhesive threads disposed around said mandrel; a common disc-like support for said spools normal to and concentric with a straight portion of said mandrel; a cylindrical shell disposed centrally on said support and traversed by said mandrel; means provided on said shell for guiding the threads from said spools onto the mandrel, and resiliently mounted pressing rolls positioned within said shell and disposed in parallel relation with said straight portion for compacting the adhesive threads wound thereon.

In testimony whereof I affix my signature.

CORNEL KMENTT.